Feb. 21, 1967  G. C. MAYER  3,305,067
PARTICLE FEEDING
Filed July 26, 1965  4 Sheets-Sheet 3

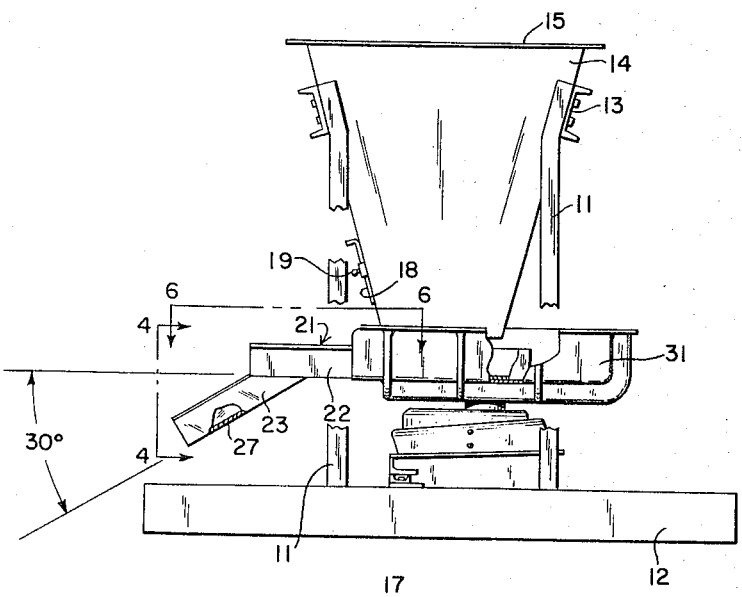
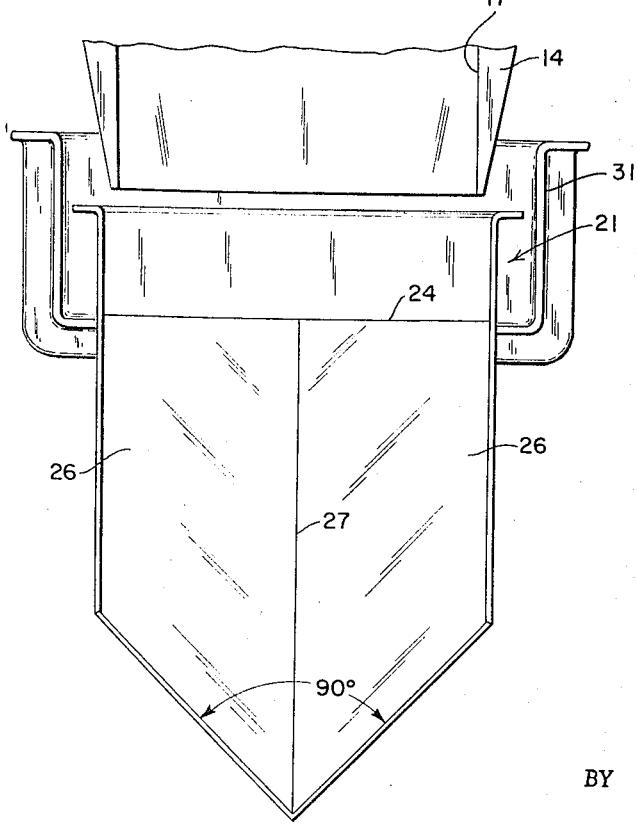

INVENTOR
GERALD C. MAYER

BY Norris & Bateman
ATTORNEYS

Feb. 21, 1967 G. C. MAYER 3,305,067
PARTICLE FEEDING
Filed July 26, 1965 4 Sheets-Sheet 4

INVENTOR
GERALD C. MAYER

BY *Norris & Bateman*

ATTORNEYS

United States Patent Office 3,305,067
Patented Feb. 21, 1967

3,305,067
PARTICLE FEEDING
Gerald C. Mayer, Wayne, N.J., assignor to Howe Richardson Scale Co. Inc., Clifton, N.J., a corporation of Delaware
Filed July 26, 1965, Ser. No. 474,594
11 Claims. (Cl. 198—30)

This invention relates to apparatus for the controlled feeding of relatively large particles such as charcoal briquette, pellets of ore, coal and the like to apparatus for counting, measuring or otherwise handling the pellets, as for example weighing apparatus or packaging machines.

For example, in the weight field a feeder of this type finds use in controlling the delivery of large size particles to the weighing apparatus. It is known that such weighing apparatus can be no more accurate than the weight of a particle multiplied by the number of particles falling at the same time into the apparatus. This invention provides for maximum accuracy of such apparatus by providing continuous regular feed of the particles in a single row into the apparatus.

In its preferred embodiment the invention will be considered as applied to the controlled feeding of relatively large pellets of the same size from a hopper to discharge in a single continuous row without excessive spacing between successive pellets. The pellets originate in a relatively stationary hopper that has a bottom opening which must be at least four times the area of the individual pellets to prevent interlocking of the pellets and provide for free flow of the pellets out of the hopper.

The pellets from the hopper fall onto a special feeder trough assembly that is shaped and sized to accommodate all of the pellets and convert their random association to the desired single file delivery to the weighing apparatus. This feeder trough comprises a pan to receive the falling pellets and an inclined trough constructed and merging into the pan in such fashion as to cause pellets moving off the pan in multiple, random rows to rearrange themselves into a single line without jamming up and without having some pellets deposited on top of others. Preferably the trough is vibrated to insure flow of the pellets along the pan to the trough.

The invention has for its major object the provision of a novel pellet or like large particle feeder wherein random delivery of the particles is converted into controlled uniform discharge of the particles in a single row.

A further object of the invention is to provide a novel feeder apparatus for supplying relatively large particles such as preformed pellets to a weighing, counting or like device.

Another object of the invention is to provide a novel feeder structure for pellets and like large particles comprising a pan section for receiving particles in random arrangement and a merging V-trough section that redirects the particles into a single file without causing the particles to jam up or to become stacked one over the other.

It is a further object of the invention to provide a novel vibratory feeder trough structure for controlled supply of relatively large particles to weighing and like apparatus.

It is a further object of the invention to provide a novel feeder trough for relatively large particles having a generally flat pan surface adapted to continuously receive random discharge of said particles from a hopper or the like and merging along a V-shaped lip with a relatively downwardly and forwardly inclined V-trough section wherein the particles becomes arranged in closely following single file for discharge at a predetermined rate into weighing, packaging and like machines for further handling of the particles.

Further objects of the invention will appear as the description proceeds in connection with the appended claims and the annexed drawings wherein:

FIGURE 2 is a side elevation partly broken away and in section showing the apparatus of FIGURE 1;

FIGURE 3 is a fragmentary front elevation showing the trough arrangement in FIGURE 1;

Figure 1:
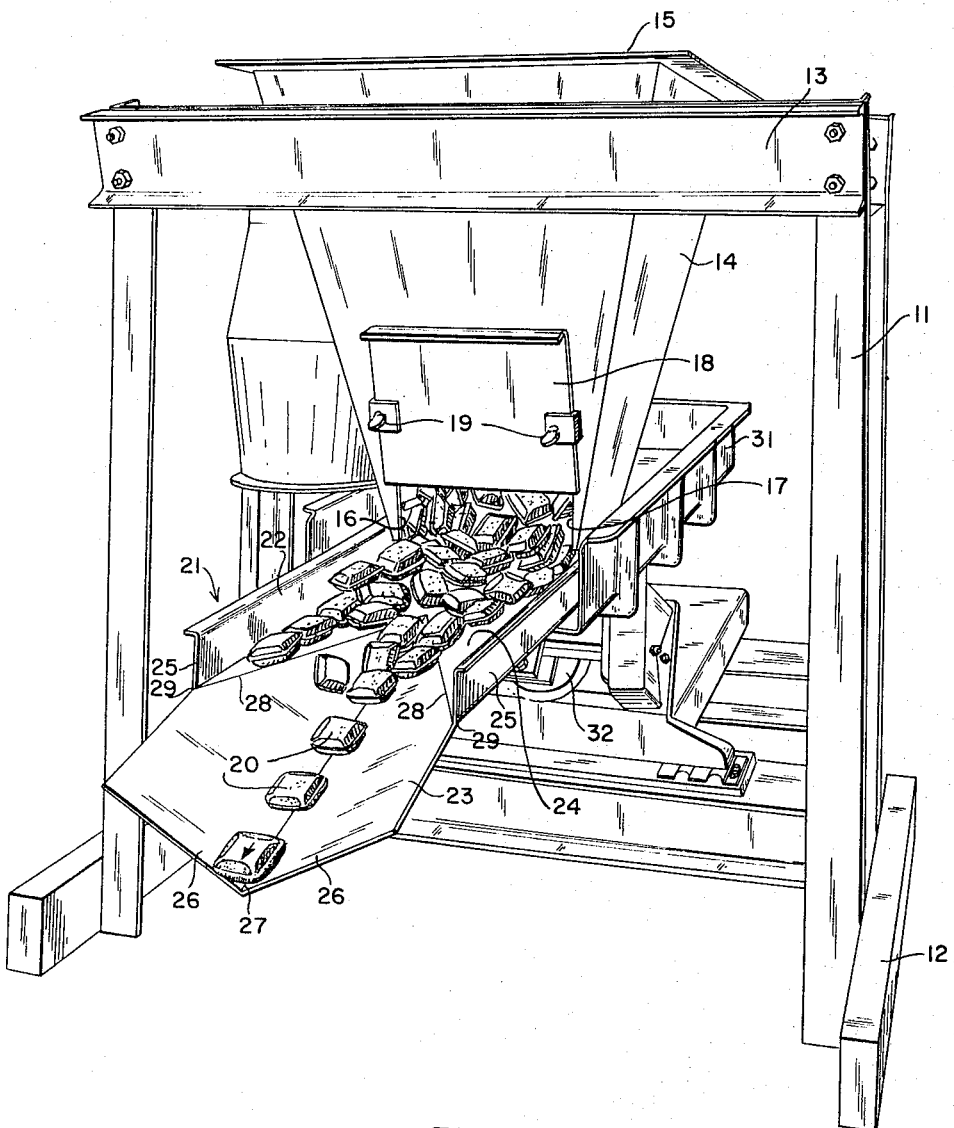
FIGURE 1 is a perspective view showing a particle feeder apparatus according to a preferred embodiment of the invention.

Referring to FIGURE 1, the preferred embodiment of the invention comprises a support structure 11 having a base 12 adapted to be secured to a floor or the like. The upper part of support 11 comprises a rigid pair of cross bars 13 which are secured as by welding to a hopper 14 that is of generally truncated pyramidal shape with its upper large open end at 15 adapted to receive the particulate material to be fed toward a weighing apparatus.

At its smaller lower end hopper 14 has a generally rectangular bottom opening 16 intersected by a slide opening 17 that may be adjusted in area by a plate 18 slidable adjustably along one side of the hopper and secured as desired by screw clamps 19. Adjustment of plate 18 will limit the size of opening 17. The particles being fed here are preformed pellets 20 of about the same size.

Mounted below the lower end of hopper 14 is a special feeder trough assembly 21 consisting essentially of a generally horizontal material delivery pan section 22 and a forwardly and downwardly inclined discharge V-trough section 23.

Delivery section 22 is a relatively shallow U-shaped, constant-width pan having a flat bottom surface 24 disposed beneath the hopper opening and upright parallel sides 25 at right angles to surface 24.

Discharge section 23 comprises laterally oppositely inclined side walls 26 that intersect at apex 27 in the vertical plane containing the longitudinal centerline of pan surface 24. Side walls 26 at their inner ends intersect surface 24 along straight corners or edges 28 which define a symmetrical juncture between sections 22 and 23 in the form of a divergent V-shaped lip 28a opening in the direction of particle flow along assembly 21. Corners 28 extend from junctures 29 at walls 26 and intersect at a point 31 lying at the inner end of apex 27 and a suitable distance rearwardly of junctures 29. The angles included between corners 28 and apex 27 are acute and equal. Side walls 26 of the V-trough section are inclined at predetermined angles to each other and to the pan surface 24 as will appear. As shown the angles included between side walls 26 and a vertical plane containing apex 27 are equal.

In the preferred embodiment of the invention the feeder trough assembly 21 is an integral sheet metal element wherein the apex 27, corners 28 and the junctures of pan surface 24 with upright sides 25 are all contoured so as to present substantially continuous merging surfaces having no recesses or other formations to objectionably irregularly influence particle movement.

The angular relationships between surface 24 and apex 27, between the side walls 26, and included between the corners 28 are important and must be correlated with each other and the size of the particles being handled by the feeder.

As pointed out before the pellets 20 fall continuously onto the pan surface relatively freely and in random distribution from the hopper. Suitable mechanism, to be described, vibrates the trough assembly sufficiently that the pellets partly aided by their own momentum will continue movement along the smooth metal surface 24 of the trough assembly in the direction of the relatively V-shaped lip 28a defined by corners 28. After passing over lip 28a the pellets move through the V-trough with increased velocity owing to the greater incline of section 23 relative to section 22.

Figure 4:
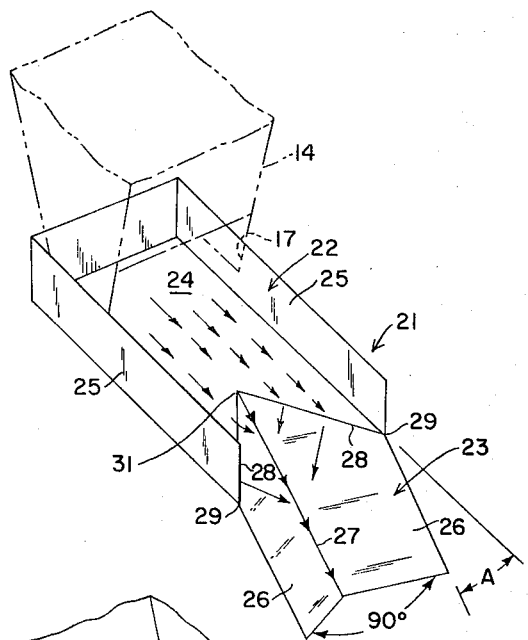
FIGURE 4 is a relatively diagrammatic perspective view of the trough assembly shown in FIGURE 1.
Figure 5:
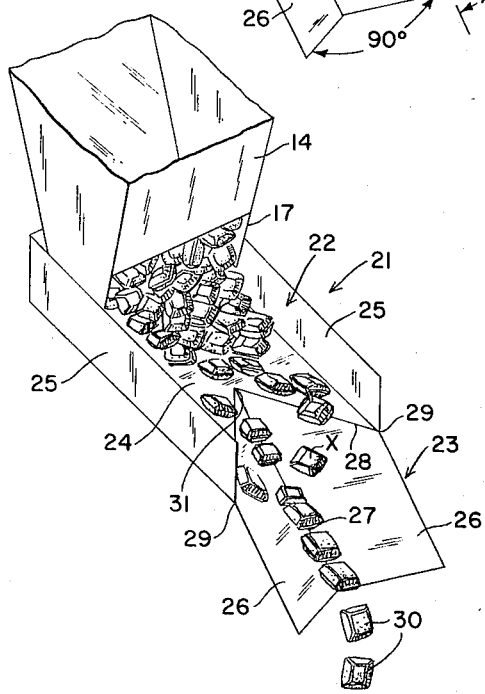
FIGURE 5 is a perspective view similar to FIGURE 4 and showing the movement of particles along the trough assembly.
Figure 6:
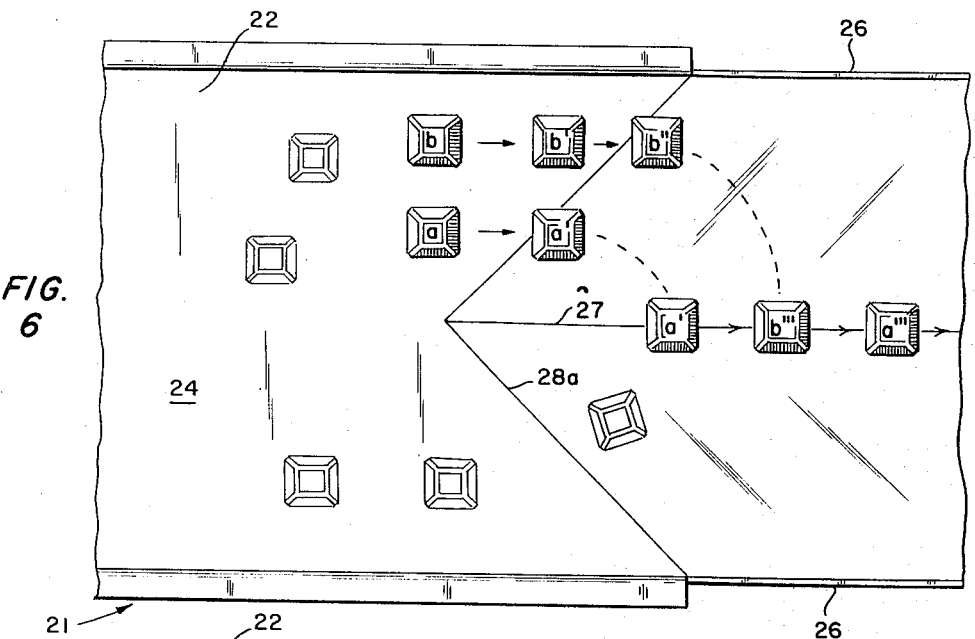
FIGURES 6 and 7 are plan views of the feeder trough assembly showing particle movements for explaining this invention.

As will be apparent from FIGURES 4–6, different laterally aligned particles moving at the same longitudinal velocity along different laterally spaced regions of pan surface 24 will arrive at lip 28a at different times owing to the acute angle of inclination that each of the corners 28 makes with apex 27. For example, as shown in FIGURE 6, a pellet $a$ which laterally aligns with a pellet $b$ but which is disposed nearer to the longitudinal centerline of the surface 24 will pass over lip 28a sooner than pellet $b$. As pellet $a$ passes over lip 28a as indicated at $a'$ its movement is longitudinally accelerated under the influence of gravity owing to the greater downward inclination of section 23 relative to section 22. The inward slope of side wall 26 toward apex 27 imparts a lateral acceleration to pellet $a$ so that at the position indicated at $a'$, pellet $a$ has a laterally accelerating velocity vector in addition to a longitudinally accelerating velocity vector.

Similarly, when pellet $b$ passes over lip 28a, it will accelerate and slide downwardly, forwardly, and inwardly toward apex 27. However, by the time pellet $b$ has reached location $b''$ at lip 28a, pellet $a$ has been accelerating at a greater rate than pellet $b$ over the time period needed for pellet $b$ to move longitudinally from location $b'$ to location $b''$. Since pellet $a$ is accelerated for a larger time than pellet $b$ it therefore will be displaced considerably in front of pellet $b$ and will be located essentially at $a''$ by the time pellet $b$ reaches apex 27 at location $b'''$.

Thus, it is clear that the steeper inclination of section 22 has the effect of removing pellets at a faster rate than that at which pellets are being supplied along section 22. As a result, the spacing between longitudinally aligning pellets will be increased as the pellets are accelerated along section 23. The forwardly opening V shape of lip 28a is needed to accelerate laterally spaced apart pellets and especially lateral aligning pellets at different times. As indicated by the foregoing description of the movement of pellets $a$ and $b$, pellets which are closer to the longitudinal centerline of section 22 will be accelerated over a longer period of time than the acceleration time period of pellets laterally spaced further away from the longitudinal centerline of section 22. Pellets closer to the longitudinal centerline of section 22 thus will attain greater longitudinal velocities in comparison with pellets spaced further away from the centerline. Owing to the increase in longitudinal spacing of pellets produced by the steeper inclination of section 23 in comparison with the slope of section 22, ample spacing between the pellets first reaching apex 27 is provided to allow the pellets more laterally removed from the centerline of assembly 21 to move into the single file of pellets along apex 27.

Figure 7:
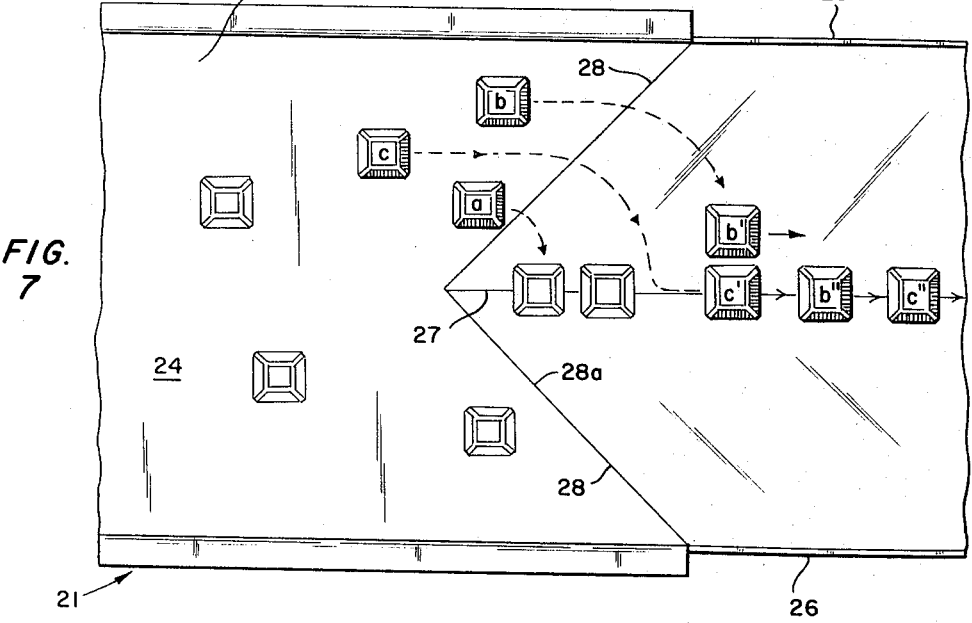

Referring now to FIGURE 7, a further pellet C is shown to be spaced rearwardly of pellets $a$ and $b$ and to be moving along a longitudinal path extending laterally between the paths of movement of pellets $a$ and $b$ along section 22. The most aggravated condition detrimental to the formation of a single file occurs when the longitudinal spacing between pellets $b$ and $c$ is such that pellet $b$ butts against the side of pellet $c$ when the latter has moved into line at location $c'$ along apex 27. Pellet $c$, being laterally closer to the longitudinal centerline of section 22 than pellet $b$, however, accelerates over a longer time period than pellet $b$ with the result that the velocity of pellet $c$ at location $c'$ is greater than the velocity of pellet $b$ at location $b'$ where it is butting against the side of pellet $c$. Owing to this difference in longitudinal velocities of pellets $c$ and $b$, pellets $c$ moves longitudinally ahead of pellet $b$, allowing pellet $b$ to slip into the row of moving pellets along apex 27 behind pellet $c$.

From the foregoing it will be appreciated that three structural features are cooperatively needed to form a single file of pellets along apex 27: (1) the steeper longitudinal incline of section 23 relative to the incline of section 22; (2) the forwardly opening, symmetrically arranged V-shaped lip defining the juncture between sections 22 and 23; and (3) the inward slope of side walls 26 toward apex 27. It is to be pointed out that a juncture between sections 22 and 23 which merely extends at right angles to apex 27 will not be effective to cause pellets to be arranged in a single row along apex 27, but will cause the pellets to become objectionably stacked one over the other, to form a plurality of side-by-side rows, or both. Either or both of these conditions will result in jamming. It is also to be pointed out that simply funneling the pellets leaving section 22 will objectionably result in jamming instead of forming of a single row of spaced apart pellets in accordance with this invention.

The angle of inclination A of apex 27 with respect to the plane of surface 24 is selected to produce adequately increased pellet velocity through the V-trough section 23. This angle must be steep enough that it enables the pellets to rearrange in a single row along apex 27, but it must not be so steep that there will be excessive spacing between the successive pellets and it must not be so steep that the pellets will slide freely along apex 27 under the influence of gravity alone. In this latter respect the angle must be such that the pellets in effect are partly pushed by a vibratory effect and partly slide by gravity along apex 27 so that there is an effectively continuous stream of particles from the hopper through the trough assembly. The angle included between side walls 26 is of sufficient size for desired movement of the pellets toward the apex 27 so as to form a single line along apex 27.

The most effective angular relationships of surfaces and edges and dimensions of assembly 21 will vary with the particle size. In one embodiment for feeding particles having the size of charcoal briquettes, the angle between apex 27 and the plane of surface 24 is about 30° and the trough side walls intersect at about 90°. The included angle of lip 28a is about 60°. All of these angles are selected to cooperate in providing timed arrival of the individual pellets so as to form a single line along the apex 27. The divergent lip formed by transition between surface 24 and the V-trough produces longitudinal redistribution of the pellets and the relative pellet speeds necessary to form the single line.

The trough assembly 21 is secured upon a platform 31 which is vibrated, by a suitable mechanism indicated at 32. This mechanism may be of any conventional type that imparts reciprocal movement to the platform to shake the trough assembly with a back-and-forth motion and reduce the depth of the pellets thereon to a single pellet depth before passing over lip 28a.

The pellets are suitably continuously delivered by a conveyor or the like into the open end 15 of the hopper, and when they pass out of the end of trough assembly the pellets arrive in uniform succession at the weighing or counting apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for feeding relatively large particles of solid material from a receptacle having a lower discharge opening to a weighing, counting or like device, said apparatus comprising a unitary, fixed position trough assembly having a delivery section disposed to receive particles in random arrangement from said receptacle and a discharge section disposed to receive and carry away particles from said delivery section, means for imparting movement to particles along said assembly, means for reducing the depth of the body of particles on said delivery section to a single particle depth, means defining a juncture of predetermined contour between the adjacent ends of said delivery and discharge sections, and surface means formed on said discharge section and cooperating with said juncture to provide for the timed arrival of the randomly arranged particles in a single file of single particle depth while moving along said discharge section.

2. Apparatus for feeding relatively large particles of solid material from a receptacle having a lower discharge opening to a weighing, counting or like device, said apparatus comprising a trough assembly having a delivery section adapted to receive particles in random arrangement from said receptacle and a discharge section intersecting said delivery section along a juncture of predetermined contour to carry away particles displaced along said delivery section, means for reducing the depth of the body of particles on said delivery section to a single particle depth before said particles pass over said juncture, said discharge section having V-shaped particle guide surface means defining an apex and being downwardly inclined relative to said delivery section to accelerate particles leaving said delivery section longitudinally in the direction of particle flow, said surface means cooperating with said juncture to provide for the timed arrival of the randomly arranged particles in a single file of single particle depth along said apex.

3. Apparatus for feeding relatively large particles of solid material from a receptacle having a lower discharge opening to a weighing, counting or like device, said apparatus comprising a trough assembly having a delivery section disposed to receive particles in random arrangement from said receptacle and a discharge section disposed to receive and carry away particles from said delivery section, means for imparting movement to particles along said assembly, said delivery section having a smooth, flat particle guide surface along which particles are adapted to slide toward said discharge section, and means for reducing the depth of the body of particles on said guide surface to a single particle depth, said discharge section being shaped in the form of a V having flat surfaced, particle guide side walls converging at an apex extending parallel to the direction of particle movement along said delivery section to laterally direct particles under the influence of gravity toward said apex, said discharge section being downwardly inclined relative to said delivery section to longitudinally accelerate particles moving onto said side walls under the influence of gravity and thereby increase the spacing between longitudinally aligning particles moving from said delivery section to said discharge section, said side walls intersecting said guide surface along a V-shaped juncture diverging in the direction of particle movement and having an apex point medially intersected by the apex of said discharge section whereby particles laterally removed from a vertical plane containing the apex of said discharge section are longitudinally accelerated along said discharge section for progressively lesser periods of time than particles on said delivery section which longitudinally align with the apex of said discharge section, said juncture and said side walls being so angularly related that the particles form a single file of single particle depth along the apex of said discharge section while moving therealong.

4. Apparatus for feeding relatively large particles of solid material from a receptacle having a lower discharge opening to a weighing, counting or like apparatus comprising a trough assembly having a delivery section adapted to receive particles in random arrangement from said receptacle and a downwardly inclined discharge section intersecting said delivery section along a juncture of predetermined contour to receive particles displaced along said delivery section, means whereby said particles are partially pushed by a vibratory effect and partially pulled under the influence of gravity for movement at least along said discharge section, means for reducing the depth of the body of particles on said delivery section to a single particle depth before said particles pass over said juncture, and surface means formed on said discharge section and cooperating with said juncture to provide for the timed arrival of said randomly arranged particles in a single file while moving along said discharge section.

5. The apparatus defined in claim 4 wherein the angle of inclination that said discharge section being sufficiently small as to prevent particles from freely sliding down said discharge section solely under the influence of gravity.

6. A trough assembly for a particle feeder comprising a rear delivery section having a flat smooth surface and a downwardly and forwardly extending discharge section adapted to receive particles advanced along said delivery section and having a smooth substantially V-shaped particle guiding surface, said delivery section terminating at its forward end in a V-shaped edge diverging and opening forwardly in the direction of particle movement along said delivery and discharge sections, said discharge section having a rearwardly facing V-shaped edge mating with the V-shaped edge of said delivery section along a juncture of corresponding contour that unitarily joins said delivery and discharge sections together, the apex of said V-shaped particle guiding surface intersecting the apexes of the mating V-shaped edges of said delivery and discharge sections, with said flat smooth surface being continuous and extending rearwardly from the V-shaped edge of said delivery section to a region spaced rearwardly from said juncture.

7. Apparatus for feeding relatively large particles of solid material from a receptacle having a lower discharge opening to a weighing, counting or like device, said apparatus comprising a trough assembly having a delivery section adapted to receive particles in random arrangement from said receptacle and a discharge section intersecting said delivery section along a juncture to carry away particles displaced along said delivery section, and means for reducing the depth of the body of particles on said delivery section to a single particle depth before said particles pass over said juncture, said discharge section being V-shaped to define an apex and being downwardly inclined relative to said delivery section to accelerate particles leaving said delivery section longitudinally in the direction of particle flow, the V-shape and downward incline of said discharge section and said juncture being so arranged and related as to align said particles in a single file of single particle depth along said apex, said apex being parallel to the direction of particle movement along said delivery section, and said juncture extending at an acute angle to said apex and diverging from said apex in the direction of particle movement whereby particles laterally closer to a vertical plane containing said apex are accelerated along said discharge section for a longer period than particles spaced further away from said plane.

8. Apparatus for feeding relatively large particles of solid material from a receptacle having a lower discharge opening to a weighing, counting or like device, said apparatus comprising a trough assembly having a delivery section adapted to receive particles in random arrangement from said receptacle and a discharge section intersecting said delivery section along a juncture to carry away particles displaced along said delivery section, and means for reducing the depth of the body of particles on said delivery section to a single particle depth before said particles pass over said juncture, said discharge section being V-shaped to define an apex and being downwardly inclined relative to said delivery section to accelerate particles leaving said delivery section longitudinally in the direction of particle flow, the V-shape and downward incline of said discharge section and said juncture being so arranged and related as to align said particles in a single file of single particle depth along said apex, said apex being parallel to the direction of particle movement along said delivery section, and said juncture being in the shape of a V diverging outwardly in the direction of particle movement and having its apex medially intersected by the apex of said discharge section whereby particles closer to a vertical plane containing the apex of said discharge section are accelerated along said discharge section for longer periods than particles more laterally displaced fom said plane.

9. The apparatus defined in claim 8 wherein said assembly is unitary.

10. The apparatus defined in claim 8 wherein the surface of said delivery section along which said particles move is smooth, flat, and relatively horizontal.

11. The apparatus defined in claim 8 comprising vibratory means for shaking said assembly with a back and forth motion to slidably push said particles therealong, the angle of downward inclination of said discharge section being sufficiently small to prevent particles moving along said discharge section from sliding freely under the influence of gravity.

References Cited by the Examiner

UNITED STATES PATENTS

| | | | |
|---|---|---|---|
| 2,801,732 | 8/1957 | Gaubert | 198—220 |
| 2,951,514 | 9/1960 | Flack | 222—55 |

EVON C. BLUNK, *Primary Examiner.*

RICHARD E. AEGERTER, *Examiner.*